(12) United States Patent
Graeve

(10) Patent No.: US 8,056,672 B2
(45) Date of Patent: Nov. 15, 2011

(54) STEERING CONTROL SYSTEM COMBINING ELECTRO-HYDRAULIC AND MANUALLY-ACTUATED PILOT PRESSURE CONTROL VALVES FOR SAFE OPERATION

(75) Inventor: Joshua D. Graeve, Peosta, IA (US)

(73) Assignee: Deere & Company, Moline, IL (US)

( * ) Notice: Subject to any disclaimer, the term of this patent is extended or adjusted under 35 U.S.C. 154(b) by 54 days.

(21) Appl. No.: 12/634,006

(22) Filed: Dec. 9, 2009

(65) Prior Publication Data
US 2011/0132681 A1  Jun. 9, 2011

(51) Int. Cl.
*B62D 5/065* (2006.01)
(52) U.S. Cl. ........................ 180/441; 180/432
(58) Field of Classification Search .......... 180/403, 180/406, 432, 441, 442; 60/403; 91/32
See application file for complete search history.

(56) References Cited

U.S. PATENT DOCUMENTS

| | | | |
|---|---|---|---|
| 6,067,782 A | 5/2000 | Diekhans | |
| 6,408,977 B1 * | 6/2002 | Obertrifter et al. | 180/442 |
| 7,200,993 B2 | 4/2007 | Khalil et al. | |
| 7,283,900 B1 | 10/2007 | Gacioch, Jr. et al. | |
| 7,334,658 B2 | 2/2008 | Berg et al. | |
| 7,451,686 B2 | 11/2008 | Graeve et al. | |
| 7,597,168 B2 | 10/2009 | Anderson et al. | |
| 2001/0004032 A1 * | 6/2001 | Zenker et al. | 180/442 |
| 2008/0053742 A1 * | 3/2008 | Hublart et al. | 180/441 |
| 2008/0116001 A1 * | 5/2008 | Graeve et al. | 180/441 |
| 2008/0271941 A1 * | 11/2008 | Young et al. | 180/441 |

* cited by examiner

*Primary Examiner* — Anne Marie Boehler

(57) ABSTRACT

A steering control system for directing fluid to steering actuators on a machine include a set of right and left manually-operated pilot pressure fluid control valves and a set of right and left electro-hydraulic (EH) pilot pressure fluid control valves, with both sets being coupled to a main steering control valve for controlling movement of the latter to effect operation of the steering actuators. An electronic control unit (ECU) includes a computer and a memory and receives signals representative of various operating parameters of the control system and of the vehicle ground speed and operates to control the EH pilot pressure control valves and a set of right and left solenoid-operated valves such that only flow from the set of manually-operated valves is connected for operating the main steering control valve to effect a least aggressive steering mode when the vehicle speed is indicative of road travel, and for also actuating the EH pilot pressure control valves for effecting a more aggressive steering mode when the vehicle speed is low indicating off-road travel. EH valve failure results in the control system defaulting to that for effecting the least aggressive steering mode, while failure of one or both of the manually-controlled valves results in the EH control valves being activated to provide that pilot pressure called for by the manually-operated valve.

6 Claims, 3 Drawing Sheets

US 8,056,672 B2

STEERING CONTROL SYSTEM COMBINING ELECTRO-HYDRAULIC AND MANUALLY-ACTUATED PILOT PRESSURE CONTROL VALVES FOR SAFE OPERATION

FIELD OF THE INVENTION

The present invention relates generally to a steering control system, and more particularly to an electro-hydraulic steering control system including manually-actuated pilot pressure control valves.

BACKGROUND OF THE INVENTION

It is known to provide work vehicles, such as industrial articulated loaders, for example, with electro-hydraulic (EH) steering control systems. One advantage of electro-hydraulic systems over pilot controlled systems, e.g. systems that use a joystick to control the flow of pilot fluid to a pilot-controlled steering control valve, is that the metering curve of the EH systems can be easily modified and can even be changed during operation based on input from the operator or machine operating conditions. U.S. Pat. No. 7,283,900 granted Oct. 16, 2009 discloses an EH steering control system wherein a controller unit is used to store a plurality of flow-metering curves representing different steering ratios respectively corresponding to different vehicle speeds, with the controller unit acting in response to steering and vehicle speed signals for sending a representative steering control signal for effecting operation of a steering valve for effecting a desired steering response. Another EH steering control system is disclosed in U.S. Pat. No. 7,200,993 and includes redundant steering pilot valves which operate when primary pilot valves do not operate satisfactorily as determined by sensed pressures.

A disadvantage of EH steering control systems is that they typically add additional failure modes to the machine. These failure modes make it difficult to use the EH steering control systems for "safety critical" functions like steering.

The problem to be solved then is that of providing a steering control system which has the aforementioned advantage of EH steering control systems without requiring failure mode redundancies which add complexities and cost.

SUMMARY OF THE INVENTION

According to the present invention, there is provided an improved EH steering control system which includes a way for adjusting the metering of a pilot-controlled steering system while providing a simple control arrangement for providing steering in the event of a failure of a proportional EH steering control valve arrangement for routing pilot pressure fluid to a main steering control valve.

The inventive result is obtained by providing a metering control that is adjusted with a proportional EH steering valve arrangement used in parallel with a manually-operated pilot pressure control valve arrangement. The steering control system includes a plurality of pressure sensors located strategically throughout the system to determine whether or not the proportional EH valve is working properly. When a failure of the proportional EH steering control valve is detected, then a solenoid-operated control valve arrangement is operated to block pilot pressure fluid from flowing from the proportional EH steering control valve to the main steering control valve. On the other hand, failure of the manually-operated pilot pressure control valve arrangement to supply pressure corresponding to that intended by the manual input results in the control unit acting to adjust the EH steering valve arrangement so that it supplies the deficiency of the manually operated pilot pressure control arrangement.

DESCRIPTION OF THE PREFERRED EMBODIMENT

Preliminarily, it is noted that the letters R and L are used in the following description to designate identical components or elements respectively used for controlling the flow of steering pilot pressure fluid or for transmitting steering control input or output signals for effecting right and left steering operation.

Figure 1:
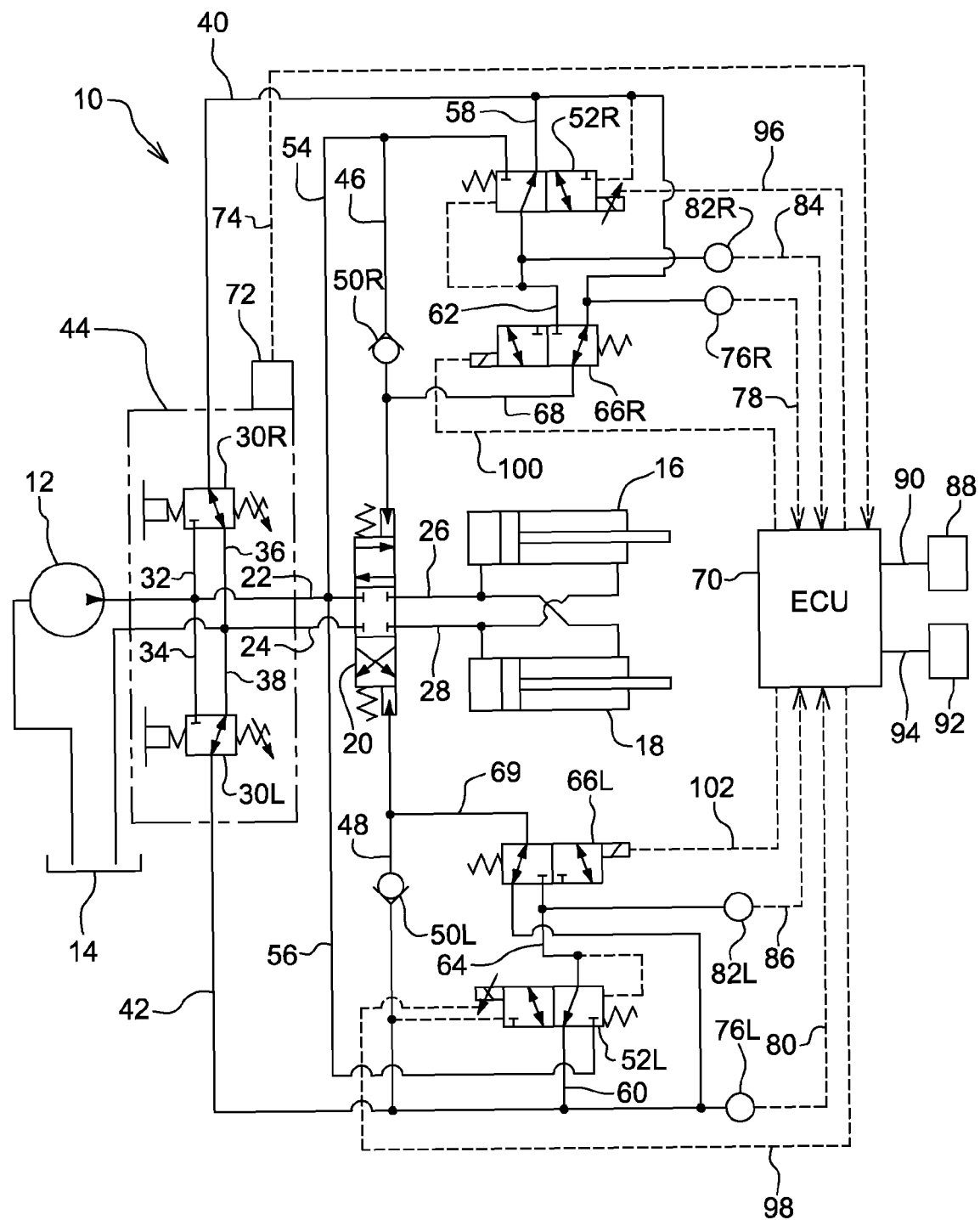
FIG. 1 is a schematic representation of an exemplary steering control system, with the system being shown with the main steering control valve positioned in a neutral centered position for straight ahead vehicle steering operation.

Referring now to FIG. 1, there is shown a steering control system 10 including a source of steering fluid pressure, here depicted as a pump 12, and a sump 14 connected to a vehicle steering actuator arrangement, here depicted as right and left steering cylinders 16 and 18, respectively, by way of a pilot-operated, main steering control valve 20. Specifically, the pump 12 is connected to a work port of the control valve 20 by a supply line 22, while the sump 14 is connected to an exhaust port of the valve 20 be a return line 24. The steering control valve 20 has a first feed/return port coupled by a feed/return line 26 to the head end of the steering cylinder 16 and to the rod of the steering cylinder 18, and has a second feed/return port coupled by a feed/return line 28 to the rod end of the steering cylinder 16 and the head end of the steering cylinder 18.

As shown in FIG. 1, the pump 12 also serves to supply pilot fluid pressure to opposite ends of the steering control valve 20. Specifically, the pump 12 is connected to a pair of identical manually-operated pilot pressure control valves 30R and 30L respectively by a pair of branch lines 32 and 34 extending from the supply line 22. Similarly, the sump 14 is connected to the control valves 30R and 30L respectively by a pair of branch lines 36 and 38 extending from the return line 24. The control valves 30R and 30L are both shown in a non-operated position blocking pressure fluid flow from the pump 12 while respectively coupling fluid supply lines 40 and 42 to the sump 14. The control valves 30R and 30L are each manually controlled by a manually-operated steering control input device such as a joystick arrangement, for example, designated by the functional box 44. The fluid supply/return lines 40 and 42 are respectively connected to upper and lower ends of the main steering control valve 20 by first and second branch lines 46 and 48 respectively containing check valves 50R and 50L oriented for preventing flow in the direction of the supply/return lines 40 and 42. Thus, the manually-operated control arrangement 44, pilot pressure fluid control valves 30R and 30L, supply/return lines 40 and 42, branch lines 46 and 48, and the check valves 50R and 50L comprise a first circuit for supplying pilot pressure fluid to the main steering control valve 20. The control valves 30R and 30L operate to supply relatively low pilot pressure for establishing the least aggressive steering settings of the main steering control valve 20, which are safe settings for operating the work vehicle for travel on the road.

The pump 12 is coupled to the main steering control valve 20 by a second circuit, including a path parallel to that established by the pressure/return branch lines 46 and 48, for establishing more aggressive steering settings of the main steering control valve 20 suitable for off-road steering operations of the vehicle. Specifically, the pump 12 is coupled to respective first ports of a pair of proportional, two-position electro-hydraulic (EH) pilot pressure control valves 52R and 52L by a pair of pressure supply branch lines 54 and 56 extending from the supply line 22. Respective second ports of the EH pilot pressure control valves 52R and 52L are connected to the supply/return lines 40 and 42 by supply/return branch lines 58 and 60. The control valves 52R and 52L may be shifted between normal, inactivated positions, as shown, wherein respective third ports are connected to the second ports, and activated positions wherein the third ports are respectively coupled to the first ports. A connecting line 62 extends between the third port of the EH pilot pressure control valve 52R and a first port of a two-position solenoid valve 66R, and a second connecting line 64 extends between the third port of the EH pilot pressure control valve 52L and respective first ports of a two-position, solenoid-operated valve 66L. Respective second ports of the valves 66R and 66L are respectively coupled to the supply/return lines 40 and 42. Respective third ports of the valves 66R and 66L are respectively coupled to the supply/return branch lines 46 and 48 at respective locations between the steering control valve 20 and the check valves 50R and 50L by connecting lines 68 and 69. The solenoid-operated valves 66R and 66L are shown in an inactivated condition wherein their respective third ports are connected to the second ports, thereby establishing connections between pilot pressure controllers at the top and bottom of the main steering control valve 20 and the pressure/return lines 40 and 42 so that a path is established for permitting pilot control pressure fluid to be relieved from the steering control valve 20.

An electronic control unit (ECU) 70, which includes a microprocessor and memory, is provided for effecting electro-hydraulic (EH) control of the main steering control valve 20. Various sensors are provided for sensing operating conditions and generating signals representing the measured quantity and inputting this signal to the ECU 70 for processing, Specifically, a position sensor 72 is provided for measuring movement of the steering input device 44, with the generated signal being connected to the ECU 70 by an input lead 74, with the ECU 70 determining from information located in the memory relating the sensed position of the device 44 to a pilot pressure conveyed by the valve 30R. Alternatively, a first pair of pressure sensors 76R and 76L are respectively provided in the pressure/return lines 40 and 42, with the respective generated signals being connected to the ECU 70 by signal input leads 78 and 80. A second pair of pressure sensors 82R and 82L are respectively coupled for sensing the pressure in the connecting lines 62 and 64, with the generated signals being connected to the ECU 70 by signal input leads 84 and 86. A vehicle ground speed sensor 88 senses either the actual ground speed (radar device for example) or the speed of a rotating element corresponding to ground speed (transmission out put shaft or axle rotation, for example), with the generated speed signal being coupled to the ECU 70 by a signal input lead 90. Finally, an operator input device 92 is coupled to the ECU 70 by an input lead 94 for permitting the operator to "key in" input data or to select a desired steering aggressiveness that is stored in memory, which aggressiveness may be stored as a value related to vehicle speed. Using the input signals and data in memory, the ECU 70 generates corresponding control signals which are respectively coupled to the proportional EH pilot pressure valves 52R and 52L by valve operating signal leads 96 and 98 for effecting shifting of the valves amounts corresponding to the magnitude of the control signal. Additionally, the ECU 70 is connected, as by leads 100 and 102, for respectively selectively activating the solenoid operated valves 66R and 66L.

Figure 2:
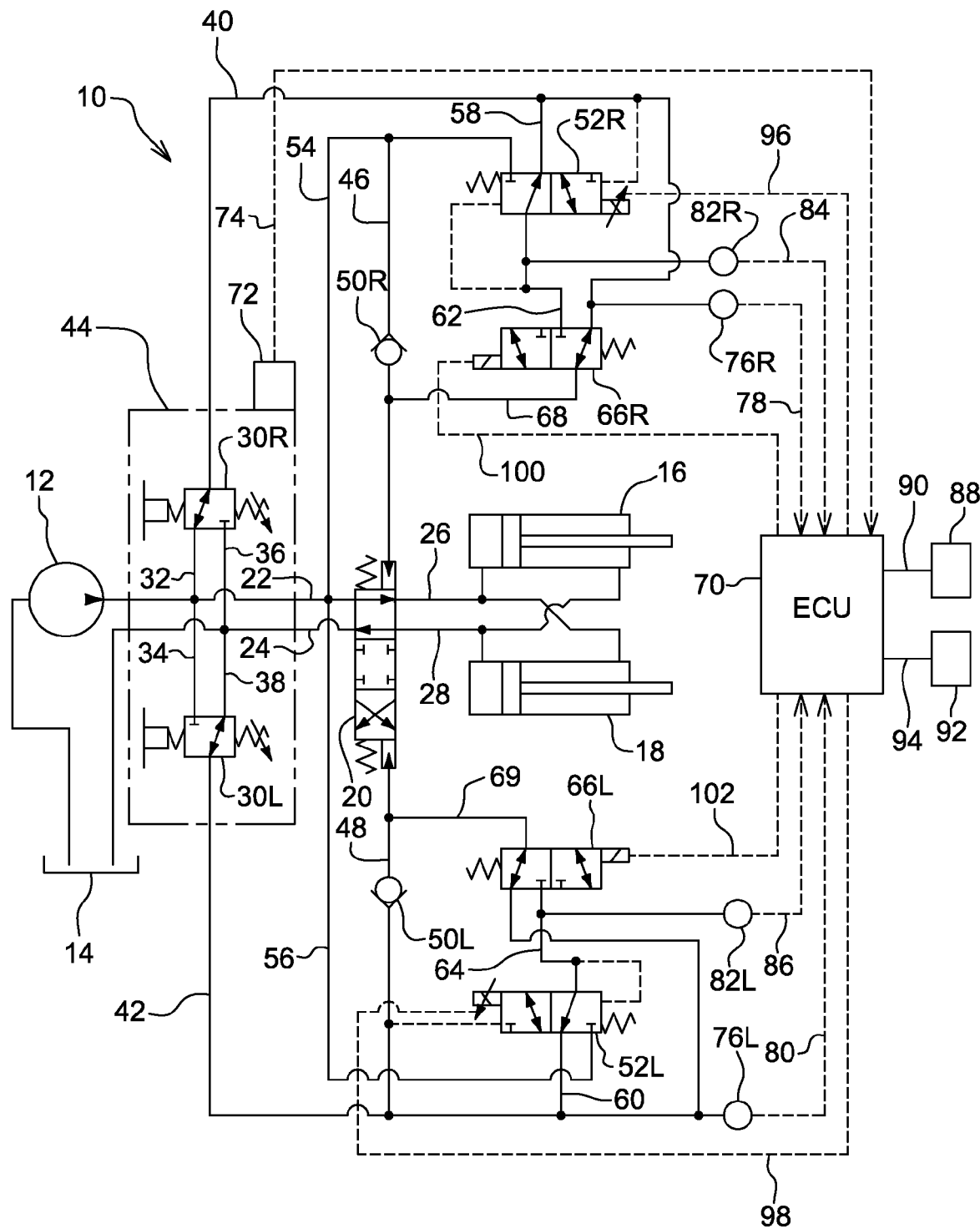
FIG. 2 is a view like FIG. 1, but showing the steering control system in a condition corresponding to the joystick being operated for causing the vehicle to be steered to the right, with only the pilot pressure directed by the manually-operated pilot pressure control valve arrangement being available for shifting the main steering control valve from its neutral position.

The operation of the steering control system 10 is as follows. Assuming that control system 10 is associated with a vehicle that can be steered to the right by extending the cylinder 16 while retracting the cylinder 18, or can be steered to the left by extending the cylinder 18 while retracting the cylinder 16, a right turn can be effected by the operator using the manually operated device 44 to shift the pilot pressure control valve 30R to an operated position connecting the pump 12 to the pressure/return line 40, as shown in FIG. 2. The amount of pilot fluid pressure corresponds directly to the amount of movement imparted to the valve 30R by the steering input control device 44 with the movement of the device 44 being sensed by the sensor 72 which generates a representative signal that is sent to the ECU 70 which uses this signal in conjunction with position/pressure data in memory to determine the corresponding control pressure that is supposed to be sent to the line 40 by the valve 30R. In addition, or alternatively, the pressure in the line 40 is sensed by the pressure sensor 76 which generates a representative signal that is sent to the ECU 70. In addition, the vehicle ground speed sensor 88 generates a speed signal representative of the sensed ground speed and sends it to the ECU 70 which uses this signal to determine whether or not the vehicle speed is too high to permit an aggressive metering of work fluid to the steering cylinders 16 and 18 from the main steering control valve 20. If the ECU 70 determines more aggressive metering of work fluid is not warranted, no signal is sent to activate the proportional EH pilot pressure control valve and steering is performed at the rate established by the position of the valve 30R. Thus, the pilot fluid flows to the top (as viewed in FIG. 2) of the steering control valve 20 shifting it downwardly so as to connect the right steering section of the valve 20 to the steering cylinders, causing extension of the cylinder 16 and retraction of the cylinder 18.

Figure 3:
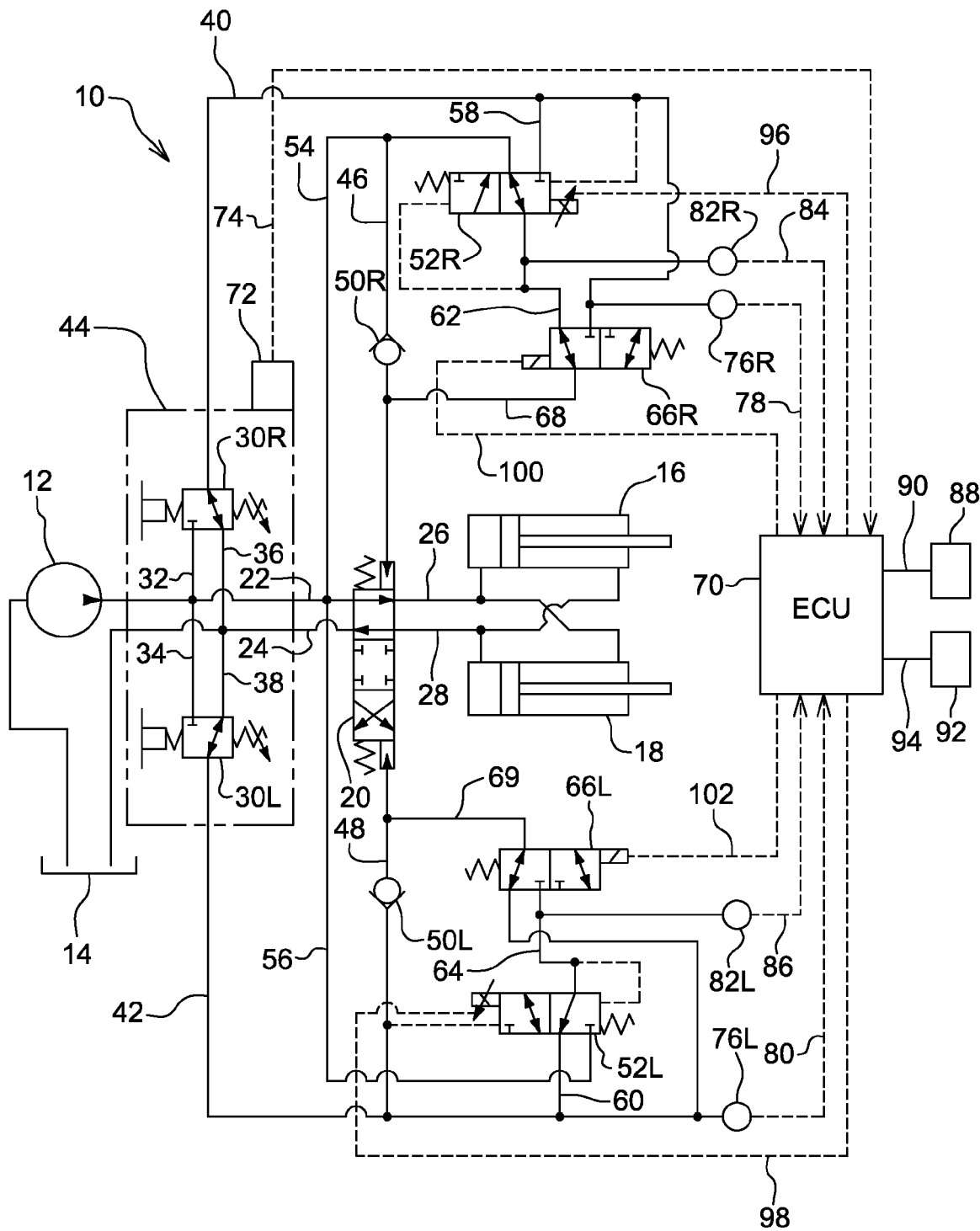
FIG. 3 is a view like FIG. 2, but showing the steering control system in a condition wherein, in addition to the pilot pressure fluid directed by the manually-operated pilot pressure control valve arrangement, further pilot pressure fluid is directed for controlling the main steering control valve by operation of the proportional EH pilot pressure control valve arrangement.

However, the above-described operation may be automatically modified in the event of a failure of the manually operated pilot pressure control valve 30R. Such a failure is indicated if the pressure sensor 76R senses a pressure which is lower than that which should correspond to the sensed position of the manually operated control device 44. This deficiency in fluid pressure is added by the action of the ECU 70 sending a signal of an appropriate strength to the proportional EH pilot pressure control valve 52R to cause it to shift an amount necessary for connecting the pilot pressure supply branch line 54 to the connecting line 62 to produce the deficient pressure there for being added to that established by the valve 30R. Concurrently, the ECU 70 connects a signal for activating the solenoid-operated valve 66R so that it shifts to connect the connecting line 62 to the top end of the steering control valve 20 by way of the connecting line 68. The condition of the control system 10 is then that shown in FIG. 3.

When the desired steering operation is over, the operator releases the control device 44 which permits the valve 30R to return to the position shown in FIG. 1, the ECU 70 then receiving a position signal from the sensor 72 indicating that the steering operation is over whereupon the actuating signals to the EH pilot pressure control valve 52R and the solenoid-operated control valve 66R are turned off. Thus, the pilot pressure fluid at the top of the steering control valve 20 is connected to sump by way of the connecting line 68, the deactivated valve 66R and the pressure/return line 40.

Assume that, during the normal steering operation described above, the sensed vehicle speed is sufficiently low that a more aggressive metering of steering fluid from the main steering control valve 20 to the steering cylinders 16 and 18 is appropriate. The ECU 70 will determine from the stored information relating metering aggressiveness to vehicle speed, the aggressiveness and related pilot fluid pressure corresponding to the sensed speed. Taking in account the pressure reading of the pressure sensor 76R, the ECU 70 will send an appropriately valued signal to the proportional EH pilot pressure control valve 52R for causing the latter to establish a pilot fluid pressure at the connecting line 62 which, when added to that supplied by the pilot pressure control valve 30R equals the desired pressure for obtaining the desired metering aggressiveness. Concurrently, the ECU 70 will automatically send a signal energizing the solenoid operated valve 66R. The condition of the control system 10 is like that shown in FIG. 3. When the steering operation is over, the operator will release the manually-operated device 44 so that it and the operated pilot pressure control valve 30R return to their unactuated positions shown in FIG. 1.

A failure of the EH control valve 52R is determined by comparing the pressure sensed by the pressure sensor 82R (P1) to the sum of the pressure sensed by the pressure sensor 76 (P2) and the pressure corresponding to the electrical signal sent to activate the proportional EH control valve 52R (P3). If P1>P2+P3, then the ECU 70 operates to deactivate the solenoid operated valve 66R leaving only the pilot pressure control valve 30R to provide pilot pressure for controlling the steering control valve 20 for providing the least aggressive metering control. In other words, the steering control system defaults to the least aggressive steering control upon failure of the proportional EH control valve.

Operation for left steering operation is similar to that described above for right steering and for the sake of brevity is not included here.

Thus, it will be appreciated that metering aggressiveness can be easily modified by the EH pilot pressure control valves 52R and 52L, while maintaining a reliable safety feature afforded by the low metering aggressiveness made available when the EH pilot pressure control valves fail. In addition, the control circuitry makes it possible to use the EH pilot pressure control valves to provide pilot control pressure to the steering control valve for effecting low metering aggressiveness in the event of a failure of one or the other of the manually-operated pilot pressure control valves Having described the preferred embodiment, it will become apparent that various modifications can be made without departing from the scope of the invention as defined in the accompanying claims.

The invention claimed is:

1. An electro-hydraulic steering control system for directing fluid to a steering actuator arrangement for use on a work machine, comprising: a pilot pressure actuated main steering control valve connected in fluid communication with a steering actuator arrangement and configured for controlling fluid flow to and from the steering actuator arrangement; right and left manually-operated pilot pressure control valves connected in fluid communication with said main steering control valve so as to control the main steering control valve to effect only a low aggressive steering mode in the steering actuator arrangement; a manually-operated steering control device coupled for effecting operation of said manually-operated pilot pressure control valves; right and left proportional electro-hydraulic (EH) pilot pressure control valves connected in fluid communication with said main steering control valve through a path exclusive of said manually-operated pilot pressure control valves; an electronic control unit (ECU) including a processor and memory and being electrically coupled to said EH pilot pressure control valves, with said ECU being coupled for receiving input signals indicative of the pressure called for by said manually-operated steering device during actuation of one or another of said right and left manually-operated pilot pressure control valves, and of an existing ground speed of the work machine; said ECU acting to activate said EH pilot pressure control valves to connect pilot fluid pressure control pressure to the main steering control valve in addition to the fluid pressure connected to the main steering control valve so as to effect a more aggressive steering mode in the steering actuator arrangement only when the vehicle speed is low indicating off-road operation.

2. The steering control system, as defined in claim 1, wherein said ECU is connected to receive a respective input signal indicative of a fluid pressure existing downstream of an operated one of said right and left manually-actuated pilot pressure control valves; with the ECU being operable to compare said existing pressure with a called for pressure value and, in case the existing pressure is below that called for so as to indicate a failure of the actuated manually-operated pilot pressure control valve, to effect operation of an associated one of said EH pilot pressure control valves to cause it to shift to supply pilot fluid pressure to the main steering control valve at a pressure value, which when added to said existing pressure equals said called for pressure value.

3. The steering control system, as defined in claim 1, wherein said ECU is connected to receive a respective input signal indicative of a fluid pressure existing downstream of an activated one of said right and left EH pilot fluid pressure control valves, with the ECU acting in response to said latter-mentioned input signal indicating a pressure greater than the sum of the pressure downstream from the actuated manually-operated valve and the pressure corresponding to an activating signal sent to said activated EH pilot pressure control valve, thus indicating a failure of the activated EH pilot pressure control valve, to cause said activated EH pilot pressure control valve to become deactivated, leaving only the actuated manually operated valve to supply pilot fluid pressure to the main steering control valve, thereby establishing said less aggressive mode of steering operation.

4. A method of directing fluid to a steering actuator arrangement of a work machine, comprising the steps of:
   a. selectively directing fluid through a pilot-pressure actuated main steering control valve controlling fluid flow to said steering actuator arrangement and determining steering operation aggressiveness;
   b. selectively directing fluid through right and left manually-operated pilot fluid pressure control valves to said main steering control valve, with the pressure of the fluid being no greater than a preselected pressure which is suitable for effecting a safe low steering operation aggressiveness; when the vehicle is operated at road speeds;
   c. sensing travel speed of the work machine;

d. selectively directing fluid through right and left proportional electro-hydraulic pilot fluid control valves to said main steering control valve when the travel speed sensed at step c is below said road speeds, with the pressure of the fluid being added to the pressure of the fluid stated in step b and with the total pressure acting on the main steering control valve being a predetermined pilot fluid pressure corresponding to the sensed travel speed under part c.

5. The method of directing fluid, as set forth in claim 4, and further including the step of:
   e. determining if the pressure of the fluid of part b is below that which would indicate a normally functioning manually-operated pilot fluid pressure control valve, and, if it is determined that the manually-operated pilot fluid pressure control valve is malfunctioning, then selectively actuating said right and left proportional electro-hydraulic pilot fluid control valves to direct fluid having a pressure that, when added to the fluid pressure occurring under part b, equals said pressure which would indicate a normally functioning manually-operated pilot fluid pressure control valve.

6. The method of directing fluid, as set forth in claim 4, and further including the step of determining whether or not the pressure delivered by the activated proportional electro-hydraulic valve in part d is greater than the sum of the pressure delivered by the actuated manually-operated pilot pressure control valve and the pressure corresponding to an electric signal used to activate the activated proportional electro-hydraulic pilot pressure control valve, and if the determination is in the affirmative, then deactivating said activated proportional electro-hydraulic pilot pressure valve so only the actuated manually-operated pilot pressure control valve is supplying fluid to the main steering control valve.

* * * * *